US006534714B2

(12) United States Patent
Daume

(10) Patent No.: US 6,534,714 B2
(45) Date of Patent: Mar. 18, 2003

(54) DEVICE FOR THE ELECTRICALLY CONDUCTING CONTACTING OF AN ELECTRICALLY CONDUCTING PART OF AN OUTER SURFACE OF A TUBE, A CABLE, OR THE LIKE, IN PARTICULAR A COAXIAL CABLE'S OUTER CONDUCTOR BARED IN SECTIONS

(75) Inventor: Britta Daume, Burgwedel (DE)

(73) Assignee: Karin Daume Maschinenteile, GmbH & Co. KG, Burgwedel (DE)

( * ) Notice: Subject to any disclaimer, the term of this patent is extended or adjusted under 35 U.S.C. 154(b) by 0 days.

(21) Appl. No.: 09/756,228

(22) Filed: Jan. 9, 2001

(65) Prior Publication Data

US 2001/0011600 A1 Aug. 9, 2001

(30) Foreign Application Priority Data

Feb. 4, 2000 (DE) ........................................ 100 04 887

(51) Int. Cl.[7] ............................................... H02G 15/02
(52) U.S. Cl. ......................................................... 174/78
(58) Field of Search ................................. 174/75 C, 78, 174/84 C; 439/98, 99

(56) References Cited

U.S. PATENT DOCUMENTS

| | | |
|---|---|---|
| 2,425,153 A | 8/1947 | Harrison |
| 3,249,685 A | 5/1966 | Heflin, Jr. |
| 4,659,870 A | 4/1987 | Jones |
| 5,313,019 A | 5/1994 | Brusselmans et al. |

FOREIGN PATENT DOCUMENTS

| | | |
|---|---|---|
| DE | 39 14 283 A1 | 4/1990 |
| DE | 196 41 396 A1 | 4/1998 |
| DE | 198 42 377 A1 | 2/2000 |
| DE | 198 42 380 A1 | 2/2000 |
| DE | 199 22 843 A1 | 2/2000 |
| EP | 0 035 630 | 9/1981 |
| EP | 0 446 380 | 9/1991 |
| EP | 0 446 382 | 9/1991 |
| EP | 0 744 788 A1 | 11/1996 |
| EP | 0 879 870 A1 | 11/1998 |
| EP | 0 940 241 A2 | 9/1999 |
| WO | WO 90/13599 | 11/1990 |

OTHER PUBLICATIONS

Brochure by Rasmussen Co. entitled "NORMA Schlauch— und Spannschellen", Rasmussen GmbH, Jun. 1984, pp 3–4.
German Search Report dated Jul. 19, 2000 (4pgs) including English translation thereof (4 pages).
International Search Report dated Mar. 6, 2001 (5 pages).

*Primary Examiner*—Chau N. Nguyen
(74) *Attorney, Agent, or Firm*—Shlesinger Arkwright & Garvey LLP

(57) ABSTRACT

A device for providing an electrical contact to a coaxial cable's outer conductor bared in sections, the device including a body adapted to abut the element to be contacted when in a mounted position, the body consisting at least partially of an elastic material containing at least one at least partially vulcanized ethylene-propylene rubber material.

20 Claims, 5 Drawing Sheets

DEVICE FOR THE ELECTRICALLY CONDUCTING CONTACTING OF AN ELECTRICALLY CONDUCTING PART OF AN OUTER SURFACE OF A TUBE, A CABLE, OR THE LIKE, IN PARTICULAR A COAXIAL CABLE'S OUTER CONDUCTOR BARED IN SECTIONS

FIELD OF THE INVENTION

The invention relates to a device for the electrically conducting contacting of an electrically conducting part of an outer surface of a tube, a cable, or the like, in particular a coaxial cable's outer conductor bared in sections.

BACKGROUND OF THE INVENTION

A device of the relevant type is known through EP 0 744 788 A1. It has a body abutting in the mounted position the element to be contacted, the body consisting of a metallic clamp band which is coated with an elastic material which is formed by rubber.

OBJECTS AND SUMMARY OF THE INVENTION

According to the invention the elastic material consists of at least one at least partially vulcanized ethylene-propylene rubber. Through the use of such an ethylene-propylene rubber the device according to the invention surprisingly obtains advantageous mechanical characteristics. Thus the elastic material of the body obtains a particularly high tensile strength over a wide range of material hardness. Moreover, the elastic material of the body is particularly resistant to ozone, weathering, and chemical influences. Furthermore, the elastic material of the body has outstanding electrical insulation characteristics. The compression set, the temperature resistance, and the flexibility at low temperatures can be chosen as a function of the formulation and the polymer composition or polymer mixture within wide limits.

The degree of vulcanization of the ethylene-propylene rubber can vary according to the conditions at hand.

The elastic material of the body can contain a single type of ethylene-propylene rubber. However, it can also contain several types of ethylene-propylene rubber.

A particularly advantageous extension of the teaching according to the invention provides that the elastic material of the body contains a mixture (blend) at least of one ethylene-propylene rubber with at least one thermoplastic elastomer (TPE). Thermoplastic elastomers have characteristics similar to plastic and are easy to process. For example, the body, in so far as it consists of the elastic material, can be produced with the use of thermoplastic elastomers in an injection process.

Surprisingly it has proven itself advantageous if the ethylene-propylene rubber is EPDM. In the case of this form of embodiment particularly advantageous mechanical characteristics result.

The body of the device according to the invention can in principle be formed rigidly. An expedient extension provides that the body is formed flexibly. In the case of this form of embodiment the body adapts itself, due to its flexibility, to the surface of the element to be contacted. This makes possible contacting even of very uneven or curved elements.

Another extension provides that the body is formed in such a way that it engages around the element to be contacted, preferably in the form of a ring or sleeve, in the mounted position. For example, in the case of the contacting of tubes or cables the body is held securely in this manner on the element to be contacted.

Another expedient form of embodiment provides that the body is formed as a clamp which can be tightened about the element to be contacted. In the case of this form of embodiment the mounting of the device according to the invention is simplified.

The body of the device according to the invention can be formed of multiple parts, for example for the contacting a tube or cable by several parts, for example in the form of a half rings, following one after the other in the circumferential direction in the mounted position. It is however advantageous if the body is formed as one part and has at its free ends tongues angled or bent off which can be connected to one another in the mounted position, preferably by means of a screw device or a clamping device. Due to the one-part formation of the body the mounting of the device according to the invention is further simplified in the case of this form of embodiment. By connecting the tongues to one another the device can be fastened in a rapid and simple manner to the element to be contacted.

Another advantageous form of embodiment provides that the device has sealing means for the sealing of a space formed in the mounted position between the element to be contacted and the body against the penetration of air and/or humidity. In this way it is prevented that humidity penetrates into a contact area in which the device contacts the electrically conducting part of the element to be contacted.

Another extension of the aforementioned form of embodiment provides that the sealing means has sealing lips of an elastic material, spaced from one another in the axial direction of the body, and extending in the circumferential direction of the body, said sealing lips being disposed on a side of the body facing the element to be contacted in the mounted position and in the mounted position sealingly abutting the outer surface of the element to be contacted. In this way one achieves a seal against penetration by air, dust, or humidity of the space formed in the mounted position between the element to be contacted and the body. In the case of the aforementioned form of embodiment the elastic material of the sealing lips expediently contains at least one thermoplastic elastomer and/or at least one at least partially vulcanized ethylene-propylene rubber, in particular EPDM.

An advantageous extension of the aforementioned form of embodiment provides that the sealing lips consist of the same elastic material as the body, in particular are formed as one piece with the elastic material of the body. In this way the production of the device according to the invention is further simplified.

According to one form of embodiment the elastic material of the body has at least one of the following material characteristics:

- the Shore hardness (A) is between 35 and 85, preferably between 47 and 70, in particular approximately 64 (DIN 53505-A [DIN=Deutsches Institut für Normung=German Institute for Standardization]),
- the tensile strength is more than approximately 6 MPa (DIN 53540),
- the elongation at tearing is more than approximately 300% (DIN 53504),
- the elastic material is ozone-resistant and/or UV-resistant and/or oil-resistant and/or weather-resistant.

In principle the body can consist entirely of an elastic material. An advantageous extension provides however that the body has a carrier element to which the elastic material is connected. In this way the stability of the device according to the invention is increased.

An extension of the aforementioned form of embodiment provides that the carrier element is formed essentially in the form of a band and extends in the longitudinal direction or in the circumferential direction of the body preferably over its entire length and preferably forms the tongues. This form of embodiment is particularly simple in construction and thus can be produced cost-effectively.

In the case of the forms of embodiment with the carrier element it consists preferably of metal, in particular of brass and/or special brass and/or slightly alloyed copper and/or chromium/nickel alloyed steel. These materials have a particularly good electrical conductivity.

Expediently the contact means have a contact element which is disposed on a side of the body facing the element to be contacted in the mounted position and is connected to it.

Extensions of the forms of embodiment with the contact element provide that the contact element consists of metal, preferably being formed by a flat litz wire, a flat band, or a braided band of metal. Contact elements of this type are cost-effective.

Expediently the contact element is connected to the carrier element. If the carrier element consists of metal, then, by producing an electrical conducting connection between a conductor, for example a grounding cable, and the carrier element, which can be accessible from outside in the mounted position, an electrically conducting connection to the element to be contacted can be produced via the contact element abutting the element to be contacted.

Another extension provides that the body-has at least one contact projection of electrically conducting-material which in the mounted position abuts the electrically conducting part of the element to be contacted and thus forms the contact means. In the case of this form of embodiment a separate contact element is not required so that the device according to the invention is further simplified in its construction.

In the case of the aforementioned form of embodiment each contact projection is expediently formed on the carrier element. If this consists, for example, of sheet metal, then the contact projections can be formed by beads or arches pressed into the sheet metal.

The invention will be described in more detail below with the aid of the accompanying drawings in which exemplary embodiments are represented.

DETAILED DESCRIPTION OF THE PREFERRED EMBODIMENTS

In the figures of the drawings the same or corresponding components are provided with the same reference numbers.

Figure 1:
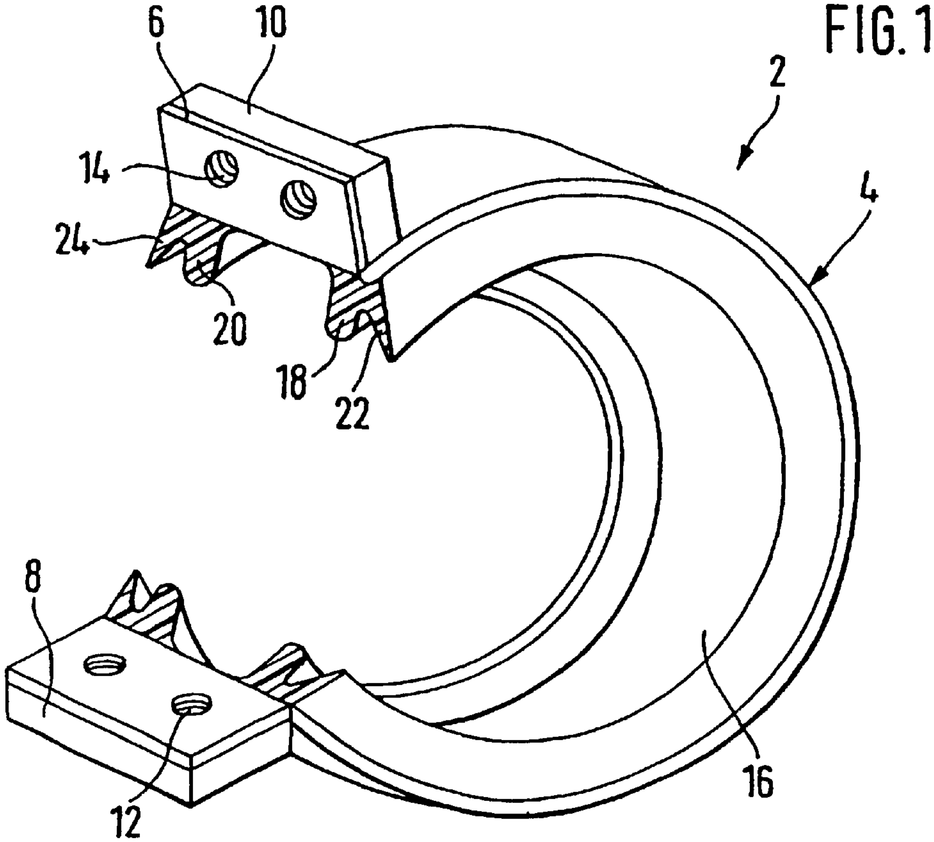
FIG. 1 is a schematic perspective view of a first exemplary embodiment of the device according to the invention.

In FIG. 1 a first exemplary embodiment of a device according to the invention in the form of a device 2 for the electrically conducting contacting of a coaxial cable's outer conductor bared in sections is represented. The device 2 has a flexible body 4 of an elastic material in which a band-like carrier element 6 of metal is imbedded.

The elastic material consists of at least one at least partially vulcanized ethylene-propylene rubber, preferably EPDM, or of a mixture (blend) at least of an ethylene-propylene rubber, preferably EPDM, with at least one thermoplastic elastomer (TPE).

The elastic material has, in the exemplary embodiment, the following material characteristics:

- the Shore hardness (A) is approximately 64 (DIN 53505-A), the compression set is less than about 25% (DIN 53517, temperature 70° C., duration 48 hours),
- the tensile strength is more than approximately 6 MPa (DIN 53504),
- the elongation at tearing is more than approximately 300% (DIN 53504),
- the recommended value for cold is less than approximately 40° C., in particular approximately −50° C. (DIN 53445-B),
- the change in hardness after aging is not higher than approximately ±3 (DIN 53508, DIN 53505-A),
- the change of the tensile strength after aging is not greater than approximately ±15% (DIN 53508, DIN 53504),
- the change of the elongation at tearing after aging is not greater than approximately ±20% (DIN 53508, DIN 53504), and
- the elastic material is most extensively ozone-resistant, UV-resistant, and oil-resistant.

The body 4 has at its ends tongues 8, 10 angled off where the carrier element 6 extends in the circumferential direction of the body 4 up into the area of the tongues. In the tongue 8 passageway holes are formed through which screws (not represented in FIG. 1) extend in the mounted position of the device 2 and are screwed into tapped holes 14 formed in the tongue 10 in such a way that by tightening the screws the tongues 8, 10 are secured to one another where the body 4 of the device 2 encircles the element to be contacted. Since the screws in the tapped holes 14 make contact with the metal carrier element 6 they can be used for the production of an electrically conducting connection of the carrier element and thus of the element to be contacted with a connecting cable not represented in FIG. 1, for example a grounding cable.

The device 2 furthermore has sealing lips. 18, 20 disposed at the inner surface 16 of the body spaced from one another in the axial direction, said sealing lips extending in the circumferential direction of the body 4 and in the mounted position of the device 2 sealingly abutting the outer surface of the element to be contacted. In the case of the exemplary embodiment represented sealing lips 22, 24 are disposed, in addition to sealing lips 18, 20, outside of these in the axial direction. The sealing lips 18, 20 as well as the additional sealing lips 22, 24 consist in the exemplary embodiment represented of the same elastic material as the body 4 and are formed as one piece with it. The device 2 according to the invention can, for example, be produced by the carrier element 6 being imbedded during the formation of the sealing lips 18, 20 as well as the additional sealing lips 22, 24 by injecting the elastic material around them. From FIG. 2 it can be seen that a contact area 28 on the inner surface 26 of the carrier element 6 is left free by the elastic material.

Figure 2:
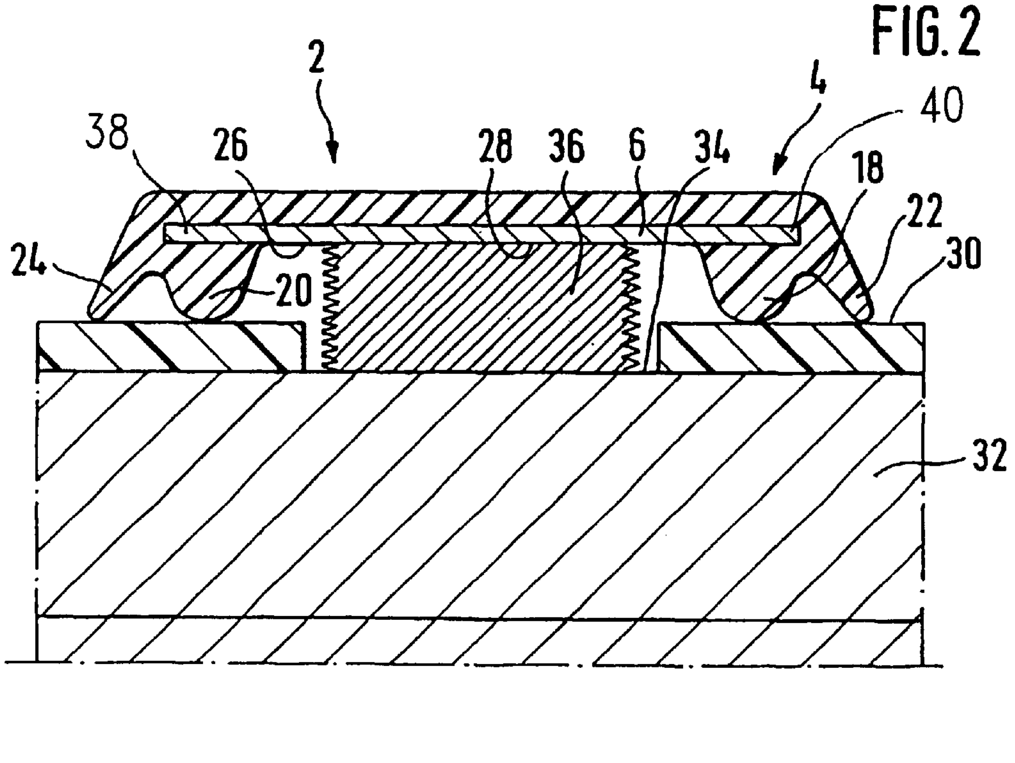
FIG. 2 is an enlarged scale an axial section through a part of a cable electrically contacted with the device according to FIG. 1.

In the mounted position represented in FIG. 2 the device 2 abuts, with the sealing lips 18, 20 as well as the additional sealing lips 22, 24, an outer surface 30 of an essentially cylindrical body, in the exemplary embodiment represented in the drawing the outer surface (jacket surface) of a cable 32. On the outer surface 30 of the cable 32 an electrically conducting area 34 is formed by baring the outer surface 30 of the cable 32. Between the electrically conducting area 34 and the inner surface 26 of the carrier element 6 a contact element 36 is disposed for the production of an electrically conducting connection between the outer surface 30 and the inner surface 26 which in the case of this exemplary embodiment is formed by an elastic graphite element which is connected to the carrier element 6 and is disposed in the axial direction of the body 4 between the sealing lips 22, 24 at a distance from them. The contact element 36 can however also consist of metal, for example being formed by a litz wire or braided metal band.

On securing the tongue 8 to the tongue 10 by means of the screws (not represented in FIG. 1) the body 4 encircles the outer surface 30 of the cable 32 where the sealing lips 18, 20 and the additional sealing lips 22, 24 are pressed together, reach abutment of the outer surface 30 of the cable 32, and thus seal the space formed between the inner surface of the body and the outer surface 30 of the cable 32 against penetration by dust and humidity. In addition sealing means can be provided on the tongues 8, 10, said sealing means sealing the space formed between the inner surface 16 of the body 4 and the outer surface 30 of the cable 32 in the circumferential direction of the body.

In addition, on securing the tongues 8, 10 in position, the contact element 36 is compressed between the inner surface 26 of the carrier element 6 and the electrically conducting area 34 on the outer surface 30 of the cable 32 and produces in this way an electrically conducting connection between the outer conductor of the cable 32 and the carrier element 6. Via the screws received in the tapped holes 14 an electrically conducting connection between the outer conductor of the cable 32 and an external conductor, for example a grounding cable, can be produced.

From FIG. 2 it can be seen that the sealing lips 18, 20 are each disposed relative to their respective longitudinal edges 38, 40 of the carrier element 6 of the body 4 in such a way that the sealing lips 18, 20 each extend in the axial direction from one area inwards from their respective longitudinal edges 38, 40 up to approximately into the area of their respective longitudinal edges 38, 40. In this way it is insured that, on application of the device 2 to the cable 32, the material of the sealing lips 18, 20 is compressed uniformly between the carrier element 6 and the outer surface 30 of the cable 32 and not respectively pushed outwards in the axial direction.

Due to the aforementioned material characteristics of the elastic material, the device 2 according to the invention, is robust, long-lived, and resistant to aging as well as mechanically strong. In addition, it can be used over a wide range of temperatures.

The device 2 represented in FIGS. 1 and 2 can also be used as a device for sealing, for example of an electrically conducting contact or the like, on an outer surface of a (in particular cylindrical) body against penetration of humidity or dust in the area of contact. In this case the contact means, in particular the contact element 36 and, in given cases, also the carrier element 6 of metal, are not required.

Figure 3:
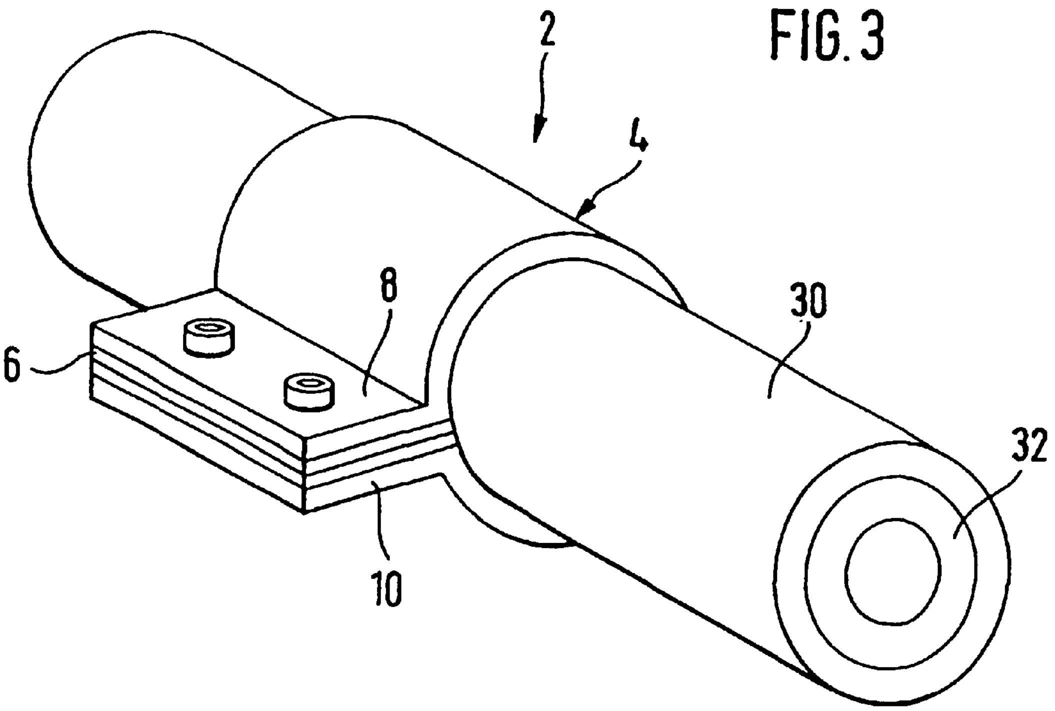
FIG. 3 is schematic perspective view the cable contacted with the device according to FIG. 1.

FIG. 3 shows the device 2 according to FIG. 1 and FIG. 2 in the mounted position. It can be seen that the body 4 in this mounted position abuts the cable 32 and engages around it in the form of a sleeve.

Figure 4:
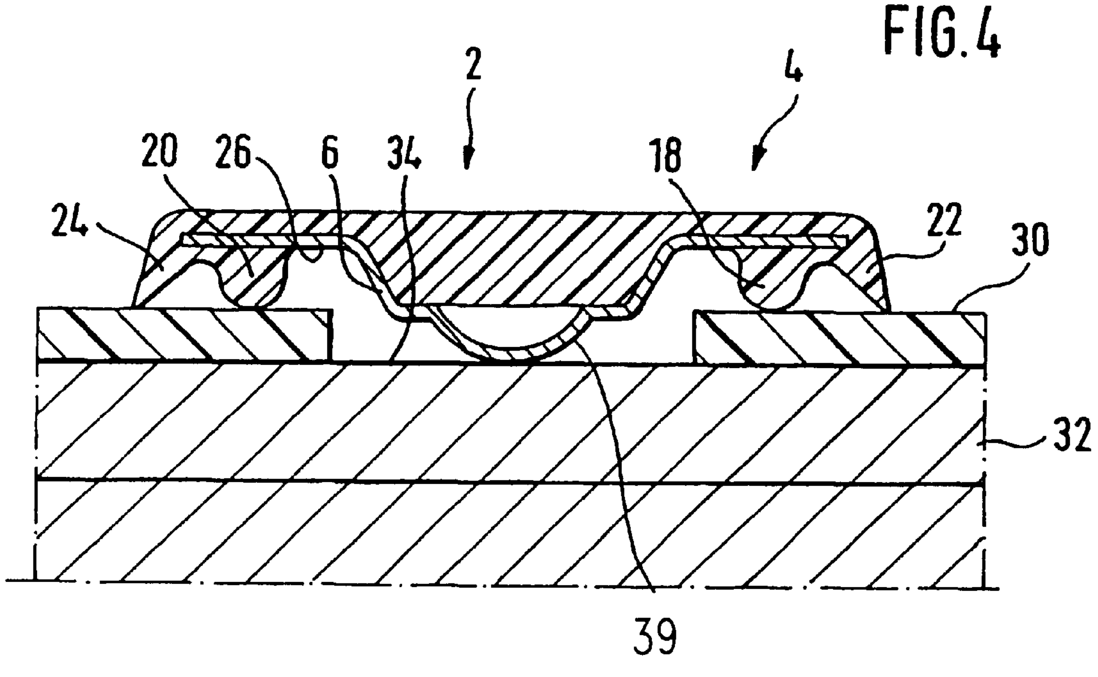
FIG. 4 is the same representation as FIG. 2, and showing a second exemplary embodiment of a device according to the invention.

FIG. 4 shows a second exemplary embodiment of a device according to the invention for electrically conducting contacting which is distinguished from the exemplary embodiment according to FIG. 1 by the fact that instead of the contact element 36 contact projections are provided of which only one contact projection provided with the reference number 39 can be seen in FIG. 4. The contact projection 39 is formed by a profiling in the form of an arch which is convex in cross-section relative to the cable 32 and essentially circular in form in plan view.

Figure 5:
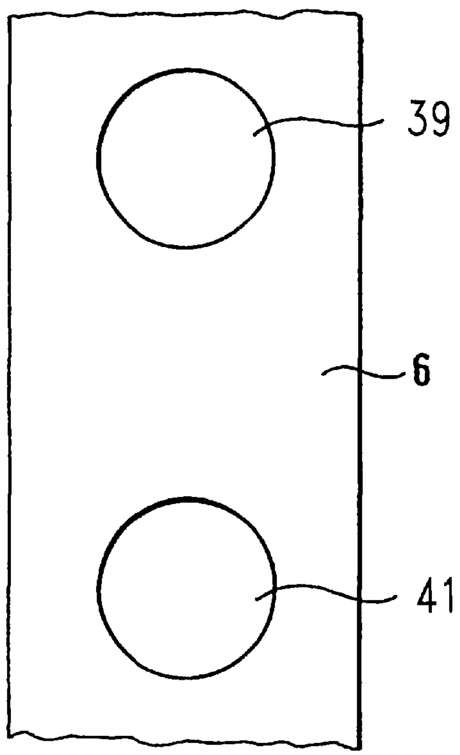
FIG. 5 is a schematic view of the radial inner surface of the device according to FIG. 1.

From FIG. 5, which shows a view of the radial inner surface of the body 4, it can be seen that the contact projection 39 and an additional contact projection 41 are each formed by a profiling in the carrier element 6 which is essentially circular in form in plan view.

Figure 6:
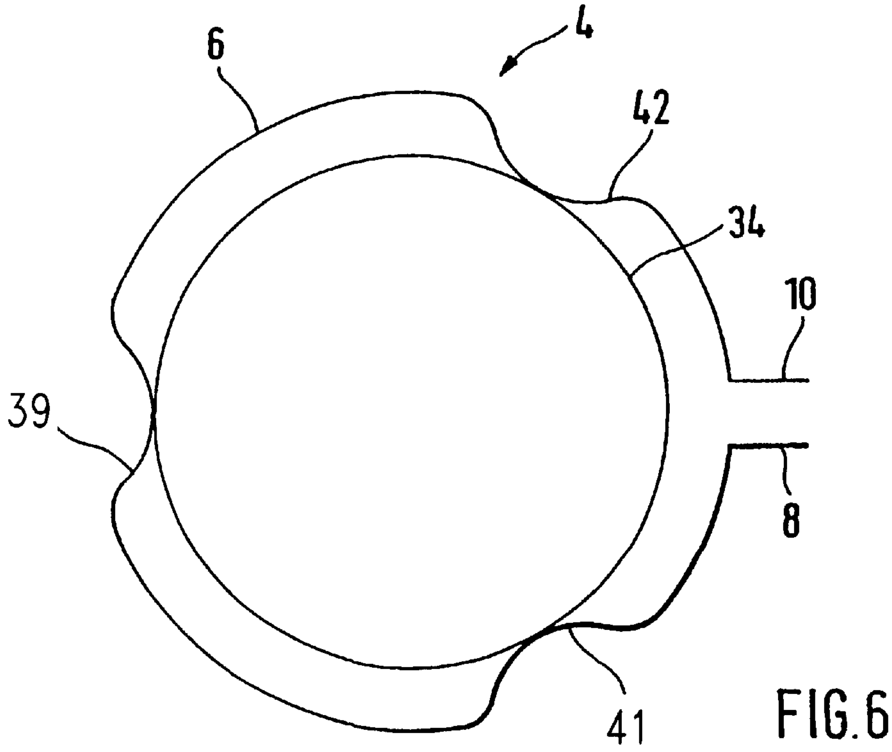
FIG. 6 is a schematic radial section through the device according to FIG. 4 when in the mounted position.

From FIG. 6, which shows a schematic radial section through the device 2 in the mounted position, it can be seen that along with the contact projections 39, 41 still another additional contact projection 42 is present and that the contact projections 39, 41, 42 are essentially equally spaced from one another in the circumferential direction.

Figure 7:
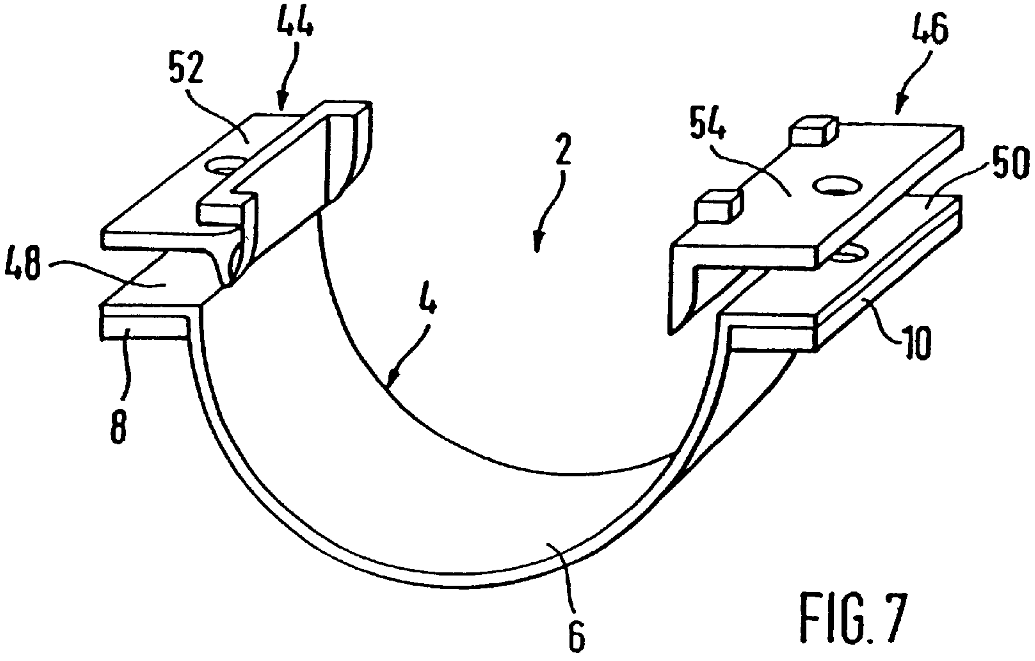
FIG. 7 is a schematic perspective view a third exemplary embodiment of a device according to the invention.

In FIG. 7 a third exemplary embodiment of a device 2 according to the invention is represented which is distinguished from the exemplary embodiment according to FIG. 1 essentially by the fact that separate end parts 44, 46 are connected to the tongues 8, 10, said end parts being represented in FIG. 7 as lifted off of the tongues 8, 10. The end parts 44, 46 are formed in this exemplary embodiment by formed parts which consist entirely of an elastic material. The end parts 44, 46 are, in the case of this exemplary embodiment, injected on plane surfaces 48, 50 of the tongues 8, 10, said plane surfaces facing one another in the mounted position. They can however also be connected in an arbitrary manner to the tongues 8, 10. The end parts 44, 46 have sealing surfaces 52, 54 sealingly abutting one another in the mounted position.

Figure 8:
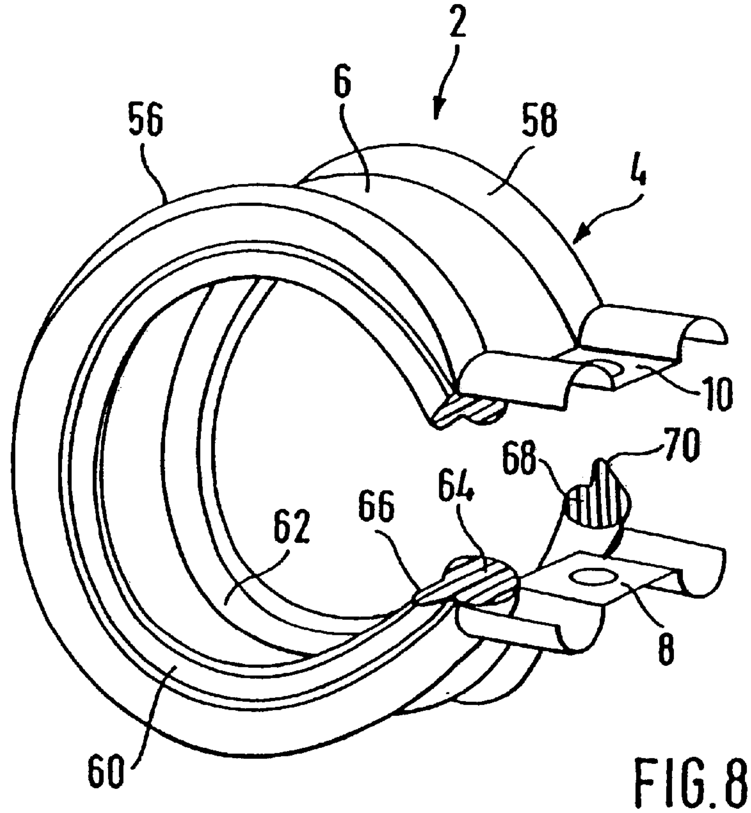
FIG. 8 is a representation similar to that shown in FIG. 7, and depicts a fourth exemplary embodiment of a device according to the invention.

In FIG. 8 a fourth exemplary embodiment of a device 2 according to the invention is represented which is distinguished from the exemplary embodiment according to FIG. 1 by the fact that the carrier element 6 has beads 56, 58, spaced from one another in the axial direction of the body 4 and extending in the circumferential direction, in which separate sealing lip parts 60, 62 of elastic material are accommodated. The sealing lip parts 60, 62 which are glued into the beads 56, 58, or can be held in them form-lockingly or clampingly, each have two sealing lips 64, 66 or 68, 70 spaced from one another in the axial direction.

Figure 9:
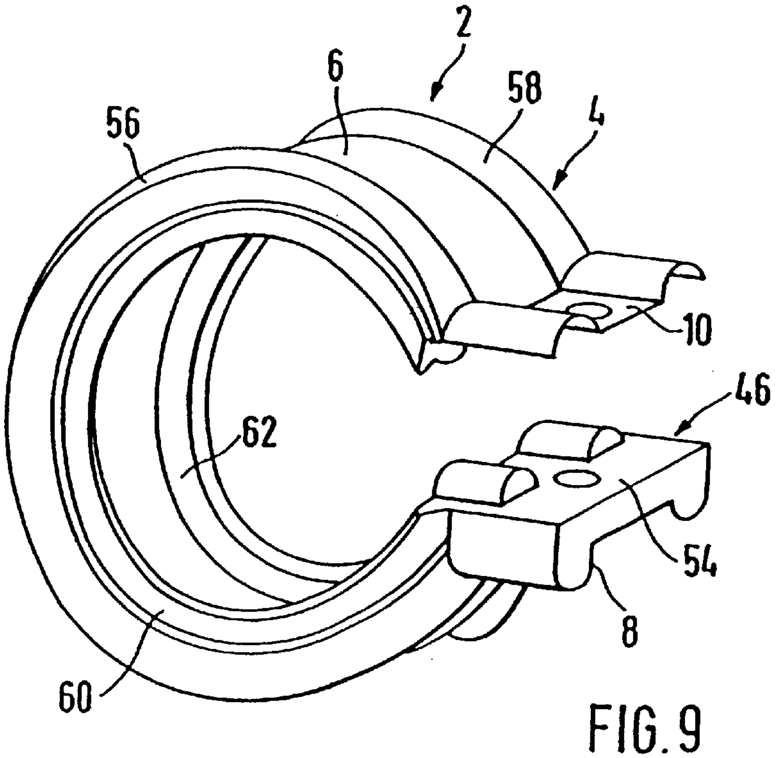
FIG. 9 is the same representation as FIG. 7, and showing the device according to FIG. 8 where an end part is connected to a tongue.

In FIG. 9 the device 2 according to FIG. 8 is represented where the end part 46 is connected to the tongue 8. In order to avoid failure of sealing in an area in which the sealing lip parts 60, 62 abut the sealing surface 54, the end part 46 can have recesses complementary to the free ends of the adjacent sealing lip parts 60, 62, in which recesses the sealing lip parts 60, 62 engage with their free ends. The end part 46 can however also be connected to the ends of the sealing lip parts 60, 62 directly, for example by being injected on.

Figure 10:
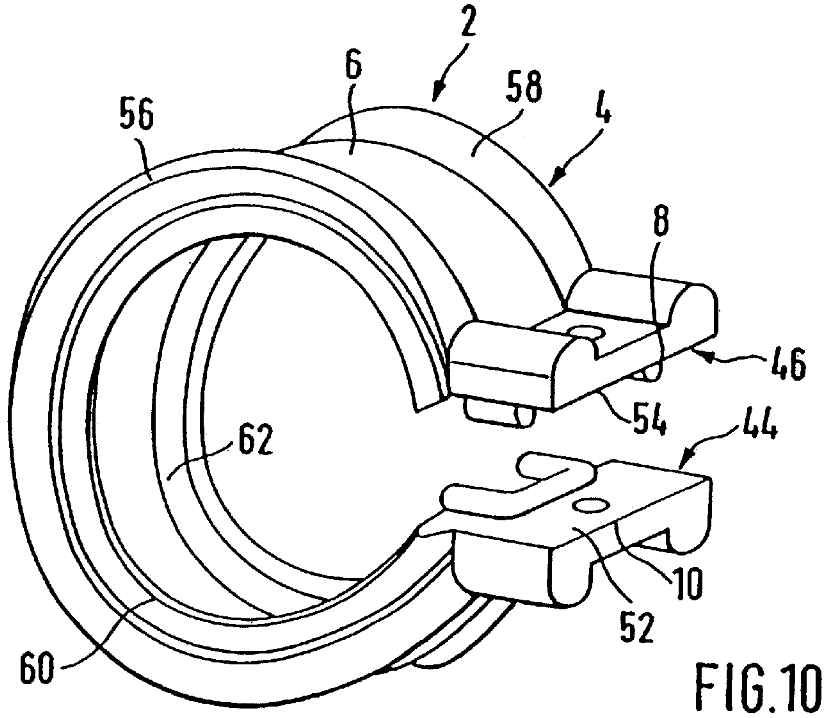
FIG. 10 is the same representation as FIG. 8, and showing the device according to FIG. 8 where end parts are connected to both tongues.

FIG. 10 shows the device according to FIG. 9 where the end part 44 is connected to the carrier element 6 in a manner corresponding to the end part 46. In the form of embodiment according to FIGS. 8 to 10 the sealing lip parts 60, 62 consist preferably of the same elastic material as the end parts 44, 46. The sealing lip parts 60, 62 can also be formed as one piece with the end parts 44, 46. The sealing lip parts 60, 62 and/or the end part 44, 46 can, for example, also be injected onto the carrier element 6.

What is claimed is:

1. A device for providing electrical contact to an outer conductor of a coaxial cable, the outer conductor having at least one bare segment, said device comprising:

a) a body, said body adapted to be mounted in an abutting relation to the coaxial cable to be contacted, said body at least partially comprising an elastic material;

b) an electrical contact, said electrical contact operatively associated with said body and adapted to provide an electrically conducting connection between the outer conductor of the coaxial cable to be contacted and an electrical ground wherein said elastic material containing at least partially vulcanized ethylene-propylene rubber having at least one of the following characteristics selected from the group consisting of a compression set of less than about 40%, a recommended value for cold less than about −20° C. to about −50° C., a change in hardness after aging not higher than about ±3, a change of tensile strength after aging of not more than about ±15% and a change of elongation at tearing after aging of not more than about ±20%; and c) said body having at least one contact projection formed of an electrically conducting material and adapted to abut against the bare segment of the coaxial cable to be contacted and provide electrical contact therewith.

2. A device as in claim 1 and wherein said elastic material comprises a mixture of at least one thermoplastic elastomer and at least one ethylene-propylene rubber.

3. A device as in claim 1 and wherein said ethylene-propylene rubber is EPDM.

4. A device as in claim 1 and wherein said body is flexible.

5. A device as in claim 1 and wherein said body is adapted to engage around the coaxial cable to be contacted in the manner of at least one of a ring or sleeve.

6. A device as in claim 1 and wherein said body is formed as a clamp adapted to be secured in position around the coaxial cable to be contacted.

7. A device as in claim 1 and wherein said body is formed as single having at respective free ends thereof, tongue members adapted to be interconnected to each other when said body is mounted to the coaxial cable, said tongue members interconnected by at least one of a screw device or clamp device.

8. A device as in claim 7 and wherein said body is operatively associated with a carrier element to which said elastic material is connected.

9. A device as in claim 8 and wherein said carrier element comprises a band member extending in at least one of the longitudinal direction or the circumferential direction of said body and substantially over its length thereof and is integral with said tongue members.

10. A device as in claim 9 and wherein said carrier element is formed from at least one metal selected from the group consisting of brass, alloyed copper and chromium/nickel alloyed steel.

11. A device as in claim 1 and further including at least one sealing member, said at least one sealing member providing a seal between said body and the coaxial cable when said body is mounted thereto, said sealing member preventing penetration of at least one of air and humidity between said device and the coaxial cable.

12. A device as in claim 11 and wherein said at least one sealing member comprising sealing lips consisting of an elastic material, said sealing lips disposed in a spaced manner from one another and in the axial direction of said body and extending in a circumferential direction of said body, said sealing lips disposed along respective sides of said body and adapted to face the coaxial cable to be contacted when said body is mounted thereto and sealingly abutting against the outer surface of the coaxial cable to be contacted.

13. A device as in claim 12 and wherein said elastic material of said sealing lips contains at least one of a thermoplastic elastomer and at least partially vulcanized ethylene-propylene rubber.

14. A device as in claim 13 and wherein said sealing lips comprise the same elastic material as said body, said sealing lips formed at least one of unitary with said body or separate from said body.

15. A device as in claim 14 and wherein at least one of said elastic material of said body and said elastic material of said sealing lips has at least one material characteristic selected from the group consisting of a Shore hardness (A) is between about 35 and about 85, a tensile strength greater than about 6 MPa, an elongation at tearing greater than about 300%, ozone-resistance, UV-resistance, oil-resistance and weather-resistance.

16. A device as in claim 1 and wherein said electrical contact includes a contact element comprising an electrically conducting material, said contact element is attached to said electrical contact so that when said body is tensioned around the coaxial cable to be contacted, said contact element will rest against the bare segment of the coaxial cable and provide electrical contact therewith.

17. A device as in claim 16 and wherein said contact element is metal.

18. A device according to claim 17 and wherein said contact element is at least one of a flat litz wire, a flat metal band and a braided metal band.

19. A device as in claim 1 and wherein said at least one contact projection is formed on said carrier element.

20. A device according to claim 1 and wherein said compression set is preferably less than about 25%.

* * * * *